Feb. 24, 1931.                    L. HOMAN                    1,794,018
                              ADVERTISING DEVICE
                              Filed Sept. 6, 1927
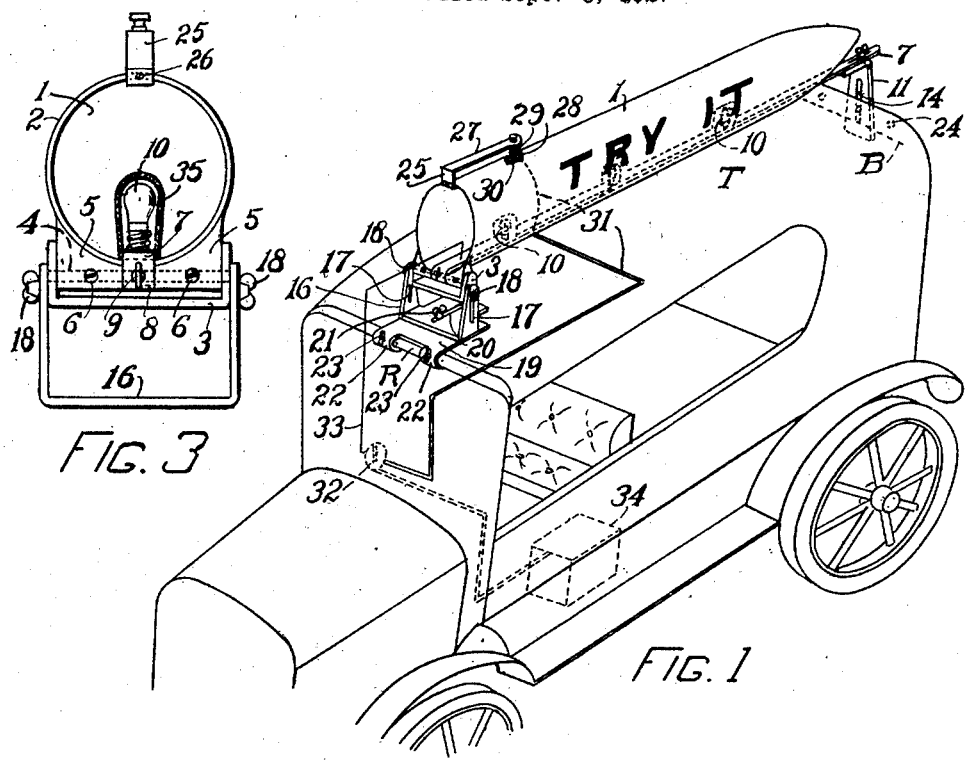
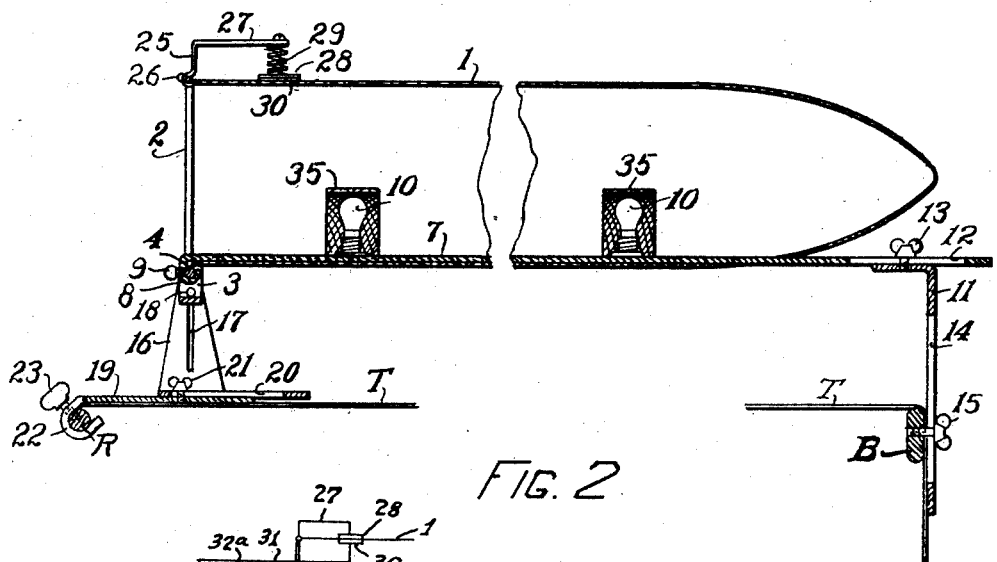
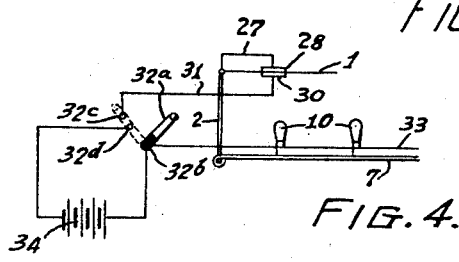
INVENTOR
LEO HOMAN
BY
Alfred T. Palmer
ATTY Patented Feb. 24, 1931

1,794,018

UNITED STATES PATENT OFFICE

LEO HOMAN, OF OAKLAND, CALIFORNIA

ADVERTISING DEVICE

Application filed September 6, 1927. Serial No. 217,602.

This invention relates to means for displaying advertising matter to public gaze and has particular reference to that style which may be attached to a movable vehicle.
The underlying feature of my invention is a bag-shaped envelope upon which is printed or stamped the message to be displayed, and I prefer to use a collapsible envelope which is inflated by the breeze of the moving car, and to illuminate this bag for night use.

Furthermore, I have invented means whereby this illuminating device will operate only when the bag is inflated, and thus the advertisement is "on" or "off", at night, as the bag is inflated or deflated.

Referring to the drawings, which accompany and form part of this specification,—

Fig. 1 is a perspective view, somewhat diagrammatic, showing an automobile equipped with one form of my invention.

Fig. 2 is a broken vertical section of my device.

Fig. 3 is a front end view of the upper portion of same.

Fig. 4 is a diagrammatical detail view of the lighting circuit.

The envelope 1, preferably made of oiled silk, is open at the forward end and this end is maintained in distended position by the metal ring 2, to which the envelope is sewed or otherwise secured. At the rear end, the bag is closed and, preferably, of cigar-shaped contour, for a purpose presently to be explained.

The ring 2 is pivotally mounted upon a yoke 3 by means of a pin 4 to which lugs 5, 5 are rigidly attached by setscrews 6, 6. Lugs 5 are here made integral with ring 2, so the latter may be turned forward upon pivot-pin 4 until it rests in horizontal position, when it is desired to render the device inoperative. This latter feature is of use during wet weather periods or, perhaps, when a head wind of such force is blowing that there is danger of splitting bag 1.

Resting within and sewed or glued to the floor of bag 1 is a metal bar 7, the forward end of which is pivotally connected to pin 4 by the ear or boss 8. A set-screw 9 may be operated by hand to lock or unlock bar 7 upon pivot 4. This set-screw, when locked, serves to hold ring 2 in either raised or lowered position, as will be later explained.

By securing bag 1 thruout its length, to bar 7, the former is held in alignment with the car and is not free to swing in any direction thru the force of cross-currents of air. This forms a very desirable feature of my invention.

Upon bar 7 are mounted electric lamps 10, arranged in series, which serve to illuminate bag 1 when desired. At or near the rear end of bag 1, bar 7 passes thru the floor of the bag and is extended to meet and slidably rest upon a bracket 11. Slot 12 and set-screw 13 serve to permit and secure this horizontal adjustment.

Bracket 11 is adjustably secured to one of the rear wooden braces B of the automobile top T by means of slot 14 and set-screw 15.

By reason of this rear end support of bar 7, it is noticeable that set-screw 9, when fastened, serves as a lock for ring 2, as previously noted. Also, by reason of the peculiar contour of the rear end of bag 1, there is sufficient slack to permit ring 2 to be turned to horizontal position without straining the fastenings of bag 1 upon bar 7. This is best seen in Fig. 2, where the bag is shown inflated.

Yoke 3 is adjustably mounted upon a U-shaped bracket 16 by means of slots 17, 17 and set-screws 18, 18. Bracket 16 is, in turn, adjustably secured upon a plate 19 by means of slot 20 and set-screws 21. Plate 19 is provided with ears or bosses 22, 22 which are adapted to detachably engage with a wooden rib R of top T and be locked thereon by set-screws 23, 23.

The various adjustments described permit my device to be mounted upon differently-sized cars or at varying heights above the same. Furthermore, set-screw 21 may be used as a swivel to rotate ring 2, if it is desired to adjust bag 1 diagonally with respect to the automobile. In that case, it would be advisable to attach set-screw 15 into one or the other of the auxiliary holes 24 which may be provided in brace B. By forming the various parts, 2, 4, 5, 7, 25, 28, 29, etc. of metal, I provide an electrical path for the lighting circuit from bar 7 to contact 28.

To cause automatic lighting of lamps 10, I secure a metal bracket 25 to the top of ring 2 by means of a set-screw 26. The rearwardly extending arm 27 of bracket 25 is thus suspended directly over bag 1, and a contact disc 28 is yieldingly supported beneath arm 27 by a light coiled spring 29. Another contact disc 30 is sewn to bag 1 directly beneath disc 28, and contact is made only when bag 1 is inflated. Thus the lights are automatically extinguished when the bag is deflated. This is best shown in Fig. 2.

Referring to Figs. 1 and 4, the lighting circuit may be seen in diagram. An insulated wire 31 may be sewn in bag 1 and from there it may be conducted to a manually operated switch 32 which is located within the driver's control. Wire 31 is electrically connected only at its terminals 30 and 32c.

Switch 32 comprises a lever 32a, pivotally mounted at 32b upon the dash-board of the vehicle, said pivot forming one of the terminal posts of the lighting circuit, to which wire 33 is connected. The free end of lever 32a is insulated from its pivot and is formed to contact with other terminals 32c and 32d, when thrown to dotted position. Wire 31 is connected to terminal 32c and the wires from battery 34 are connected to terminals 32b and 32d, as seen in Fig. 4. A return wire 33, connected in multiple with lamps 10 and thru them to bar 7, leads to switch terminal 32b.

In operation, bag 1 is deflated whenever the car is standing still and lamps 10 are extinguished; but when the vehicle is moving, the resultant breeze inflates the bag so the advertising matter may be read and, if switch 32 is turned on, lamps 10 are ignited by such inflation.

In actual practice, as the speed of the car increases or diminishes, the bag will wholly or partially inflate. In this latter case, lamps 10 will not light; so the lighting may be said to be intermittent, on or off, giving somewhat the same effect as is caused by the flashing illuminated signs that are in general use upon store fronts, etc. This I consider a valuble feature of my invention, but not an essential one.

Lamps 10 are protected by a metal covering 35 to prevent direct contact between the envelope 1 and the heated lights 10. This covering 35 is preferably of wire netting.

I do not limit myself to the precise construction shown nor to its applicability to automobiles, as my invention may equally well be attached to water or air vehicles.

What I claim is:—

1. In combination with a vehicle adapted for use on city streets, a frame secured to the top of said vehicle; a collapsible bag equipped for the display of advertising matter; means for so mounting said bag on said frame that the breeze caused by the forward motion of said vehicle will inflate said bag; means, independent of said breeze, for maintaining the forward end of said bag in distended position; and a support attached to said bag near its closed end and adapted to hold said bag in alignment with said vehicle.

2. In combination with a vehicle adapted for use on city streets, an adjustable frame secured to the top of said vehicle and in alignment therewith; a collapsible bag equipped for the display of advertising matter, the bottom of said bag being secured, thruout its length to said frame, said bag being so positioned that the breeze caused by the forward motion of said vehicle will inflate said bag; and means, independent of said breeze, for holding the mouth of said bag in distended position.

3. In combination with a vehicle adapted for use upon city streets, a frame rigidly secured to the top of said vehicle and in alignment therewith; a collapsible bag equipped for the display of advertising matter, said bag having its bottom portion secured, thruout its length, to said frame and being so positioned that the breeze caused by the forward motion of said vehicle will inflate said bag; and means, independent of said breeze, for holding the mouth of said bag in distended position.

4. A frame; a collapsible bag equipped for the display of advertising matter, said bag being secured, thruout its length to said frame; a metal ring adapted to hold the mouth of said bag in distended position; lamps within said bag, said lamps being electrically connected with said frame and said ring; means, connected with said bag and with said ring for automatically lighting said lamps; and a manually operative switch for controlling the lighting of said lamps.

5. A collapsible bag adapted, when inflated, for the display of advertising matter; means for so mounting said bag upon a movable vehicle that the breeze caused by the motion of said vehicle will inflate said bag; alternative means for securing said bag to prevent such inflation; and means for illuminating said bag.

6. A collapsible bag; a metal ring secured to the mouth of said bag; a contact disc suspended over said bag; a bracket supporting said disc and electrically connected to said ring; a second contact disc secured to said bag and insulated therein; light bulbs within said bag; means for causing said bulbs to light when said discs come in contact with each other; and means for causing such contact.

7. A collapsible bag; a ring adapted to hold the mouth of said bag in distended position; a frame upon which said bag is mounted; means for securing said frame to a movable vehicle; and means for pivotally mounting said ring upon said frame.

8. A bag-shaped envelope; means for attaching said envelope to a movable vehicle; and automatic means for intermittently illuminating said envelope.

In testimony whereof, I hereby affix my signature this 31 day of August, 1927.

LEO HOMAN.